US006945463B2

(12) United States Patent
Rockstein et al.

(10) Patent No.: US 6,945,463 B2
(45) Date of Patent: Sep. 20, 2005

(54) MULTI-CHANNEL SCANNING SYSTEM WITH COMMON DECODER

(75) Inventors: George B. Rockstein, Audubon, NJ (US); David M. Wilz, Sr., Sewell, NJ (US); George J. Kolis, Pennsauken, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 24 days.

(21) Appl. No.: 10/018,622

(22) PCT Filed: Apr. 18, 2001

(86) PCT No.: PCT/US01/12636

§ 371 (c)(1),
(2), (4) Date: Mar. 12, 2002

(87) PCT Pub. No.: WO01/80164

PCT Pub. Date: Oct. 25, 2001

(65) Prior Publication Data

US 2003/0062417 A1 Apr. 3, 2003

Related U.S. Application Data

(60) Provisional application No. 60/197,709, filed on Apr. 18, 2000.

(51) Int. Cl.[7] ................................................. G06K 7/10
(52) U.S. Cl. ............................ 235/462.14; 235/462.01; 235/462.17; 235/462.25
(58) Field of Search ........................ 235/462.01, 462.25, 235/462.26, 462.27, 462.28, 462.14, 462.17, 462.02

(56) References Cited

U.S. PATENT DOCUMENTS

| 5,545,886 | A |   | 8/1996  | Metlitsky et al.         |
|-----------|---|---|---------|--------------------------|
| 5,635,700 | A | * | 6/1997  | Fazekas ......... 235/462.06 |
| 5,925,869 | A |   | 7/1999  | Still et al.             |
| 5,946,427 | A |   | 8/1999  | Kanmitsu                 |
| 5,984,185 | A |   | 11/1999 | Dickson et al.           |
| 6,213,399 | B1| * | 4/2001  | Tsi et al. ....... 235/462.08 |

FOREIGN PATENT DOCUMENTS

EP          0 527 267 A       2/1993

* cited by examiner

*Primary Examiner*—Ahshik Kim
(74) *Attorney, Agent, or Firm*—Lerner, David, Littenberg, Krumholz & Mentlik, LLP

(57) ABSTRACT

A multi-channel scanner having several photodetectors (12a–12d) and several lasers (10a–10d) for scanning along multiple paths (50a–50d) incorporates a separate input channel (26a–26d) for each photodetector. Each channel provides a sequence of data elements representing light reflected from points along the associated scanning path, and the data elements from each channel are stored in separate FIFO buffers (20a–20d). A multiplexer (22) takes data elements from the various buffers so as from a consolidated stream of data elements (80) incoporating the data elements from the various channels. This stream is processed in a single decoder (24) to recover data denoted by the bar code. Use of a single decoder minimizes the cost and size of the system.

5 Claims, 2 Drawing Sheets

MULTI-CHANNEL SCANNING SYSTEM WITH COMMON DECODER

CROSS-REFERENCE TO RELATED APPLICATIONS

The present application claims the benefit of U.S. Provisional Patent Application No. 60/197,709 filed Apr. 18, 2000 under 35 U.S.C. Section 119(e).

TECHNICAL FIELD

The present invention relates to optical scanners such as bar code scanners.

BACKGROUND OF THE INVENTION

Optical scanners are widely used for reading data encoded in symbols on various items. One common application of optical scanning is in reading of one-dimensional bar code symbols such as Universal Product Code ("UPC") symbols and other symbols in which information is represented by a set of marks in the form of parallel lines and spaces between the marks. Optical scanners are also used to read two-dimensional bar code symbols such as the PDF417 code in which information is represented by a rectilinear pattern of marks and spaces in the form of blocks, such that the pattern as a whole resembles an irregular checkerboard. Most commonly, the marks are dark and hence have low reflectivity, whereas the spaces are light and hence have high reflectivity.

Optical scanners typically operate by directing a beam of light from a source such as a laser onto the object bearing the symbol and detecting the intensity of the reflected light. The scanner typically incorporates optical elements which focus the beam of light to a relatively small spot at the object bearing the symbol and which move the optical elements so as to sweep the spot of light in a predetermined scanning path across the object as, for example, in a series of parallel lines referred to as "raster". These scanners also include a photodetector such as a photodiode or phototransistor which receives the light reflected from the object. As the spot of light moves over the object and encounters light and dark areas on the surface of the object, the photodetector is exposed to reflected light from the spot and hence is exposed to light reflected from points on object surface along the scanning path. The amount of light reflected to the photodetector varies with the reflectivity of the object surface at different points along the scanning path and the electrical signal produced by the photodetector varies correspondingly. Similar effects can be achieved by optical elements which limit the field of view of the photodetector to only a small spot so that the photodetector is exposed only to the light reflected by the object surface at the spot, and which sweep that spot along the desired scanning path. Some scanners use both techniques, so that both the illumination and the field of view of the photodetector are limited to the same spot, and that spot is swept along the scanning path.

The variations in the electrical signal from the photodetector typically are converted by known analog processing circuitry into a digital signal having a first or "space" value, (e.g., 0) when the spot is on a point having high reflectivity and having a second or "mark" value (e.g., 1) when the spot is focused on a point having low reflectivity. The digital values occurring at successive times represent the signal of the photodetector at successive times and hence representing the reflectivity of the object surface at successive points along the scanning path. The digital signal typically is converted by a unit referred to as a "digitizer" to a series of transition data elements, each such transition data element including data denoting the occurrence of a transition from the mark value to the space value or vice-versa, and the time interval since the previous transition. Each such time interval represents the width of a mark (dark region) or a space (light region) on the object being scanned. Because the time interval data commonly is obtained by counting cycles of a digital clock between transitions, the time interval data is commonly referred to as bar or space "count" data. These values are supplied to a decoder which uses known algorithms to recover from such values the information denoted by the symbol, such as numbers in the case of a UPC code.

Many bar code scanners perform several scans along different paths at different locations and/or at different orientations. For example, to read a one-dimensional bar code, the scanning path must extend across the bars rather than parallel to the bars. When objects bearing one-dimensional bar codes are presented in random orientation relative to the scanner, using several different scanning paths at different orientations relative to the scanner increases the probability that at least one scan path will be oriented correctly relative to the code on each object. Also, the scanner may provide scanning paths at different distances from the scanner, so that objects presented at different distances from the scanner can be successfully scanned.

Such multi-path scanners commonly use multiple photodetectors. For example, one holographic bar code laser scanner disclosed in commonly owned U.S. Pat. No. 5,984,185 uses multiple lasers and a separate photodiode associated with each laser. Similar scanners are disclosed in U.S. patent application Ser. No. 09/251,568, filed Feb. 17, 1999 and U.S. patent application Ser. No. 08/573,949 filed Dec. 18, 1995, now abandoned. The contents of the foregoing applications and patent are incorporated herein by reference.

Typically, a separate set of components including a photodiode, an analog processing circuit, digitizer and decoder is associated with each laser. Such a set of components is referred to as a "channel". The decoded information from each channel is then provided as input to a multiplexing microprocessor to derive a single output. The owner of the present application has practiced this method of signal detection, processing and decoding in its HoloTrak (registered trademark) line of holographic bar code scanners.

This approach requires that each channel have a complete set of separate circuitry, including a separate decoder for each channel. Moreover, an additional microprocessor or other multiplexing device must be provided to combine the decoded information from the plural channels into a single stream of decoded data for delivery to a host computer or other device which uses the decoded information. These factors add to the size and cost of the scanner. Thus, still further improvement would be desirable.

DISCLOSURE OF THE INVENTION

One aspect of the invention provides a scanner for scanning objects bearing codes such as bar codes. A scanner according to this aspect of the invention desirably includes a plurality of input channels, each said channel including a photodetector. Each input channel is arranged to provide data elements representing light impinging on the photodetector of such channel. The scanner also includes means for exposing the photodetectors of said channels to light from objects to be scanned so that the light impinging on the photodetector of each channel represents an optical property of objects to be scanned at a series of points along a scanning path associated with such channel. As in a conventional scanner, the means for exposing most typically includes one or more light sources such as one or more lasers, together with optical elements for forming the emitted light from the sources into a plurality of scanning beams, each focused at a spot, and for moving the spot of each beam along a scanning path. The photodetectors typically are arranged to receive light reflected from objects at the scanning paths, so that the light impinging on each photodetector at various times represents the reflectivity of the object surface at points along the path.

The scanner according to this aspect of the invention most preferably includes data stream means for outputting a stream of data elements including data elements from the plural channels. The scanner further includes a decoder operative to examine the stream of data elements and recover information denoted by the data elements in the stream. In a particularly preferred arrangement, only one such stream of data elements is provided to only a single decoder. Because the same decoder handles data from several input channels, it is not necessary to provide separate decoders for each individual channel. This tends to reduce the size and cost of the scanner. Also, where a single decoder is used, there is no need for additional elements to combine the outputs from multiple decoders.

The data stream means desirably includes individual FIFO buffers associated with individual input channels so that data elements from each channel are stored in the FIFO buffer associated with that channel, and a multiplexer which retrieves data elements from the outputs of different FIFO buffers at different times so as to form the stream of data elements. Most preferably, each input channel includes a signal processing and digitization circuit arranged to supply the data elements as transition data elements, each such transition data element including data denoting a transition as mark-to-space or space-to-mark and data denoting the duration of an interval between successive transitions. This provides data in the form commonly used by conventional decoders. Moreover, the data is effectively run-length encoded within each channel, thus drastically reducing the number of data elements which must be handled by the buffers and multiplexer or other elements used to consolidate the data from different channels into the data stream.

Thus, in a particularly preferred arrangement, a scanner or bar code scanning system includes:
 a plurality of laser light sources;
 a plurality of optical input channels, each having,
   (a) a photodetector;
   (b) a signal processing circuit;
   (c) a digitizer circuit; and
   (d) a FIFO buffer; and
 a single microprocessor for receiving the output from each optical channel and decoding the output to produce bar code symbol character data.

A further aspect of the invention provides methods of scanning objects bearing codes such as bar codes. A method according to this aspect of the invention desirably includes the step of exposing a plurality of photodetectors, each associated with a separate input channel, to light from objects to be scanned so that the light impinging on each photodetector represents an optical property of objects to be scanned at a series of points along a scanning path associated with such photodetector. Each such input channel provides data elements representing light impinging on the photodetector of such channel.

The method further includes forming a stream including data elements from a plurality of the channels and examining the stream of data elements in a decoder and recovering information denoted by the data elements in the stream of samples. The method most typically includes the step of storing data elements from each channel, such as in a buffer associated with each channel. In this case, the step of forming a stream of data elements is performed by recovering the stored data elements from each channel, such as by operating a multiplexer to direct data elements from the buffer associated with each channel into the data stream at different times. The stream of data elements may include a plurality of separate series of data elements, the data elements within each such series being data elements from a single one of said channels. As further discussed below, this permits decoding by standard decoders arranged to operate on data from a single channel. Methods according to this aspect of the invention provide advantages similar to those discussed above in connection with the apparatus.

MODES FOR CARRYING OUT THE INVENTION

Figure 1:
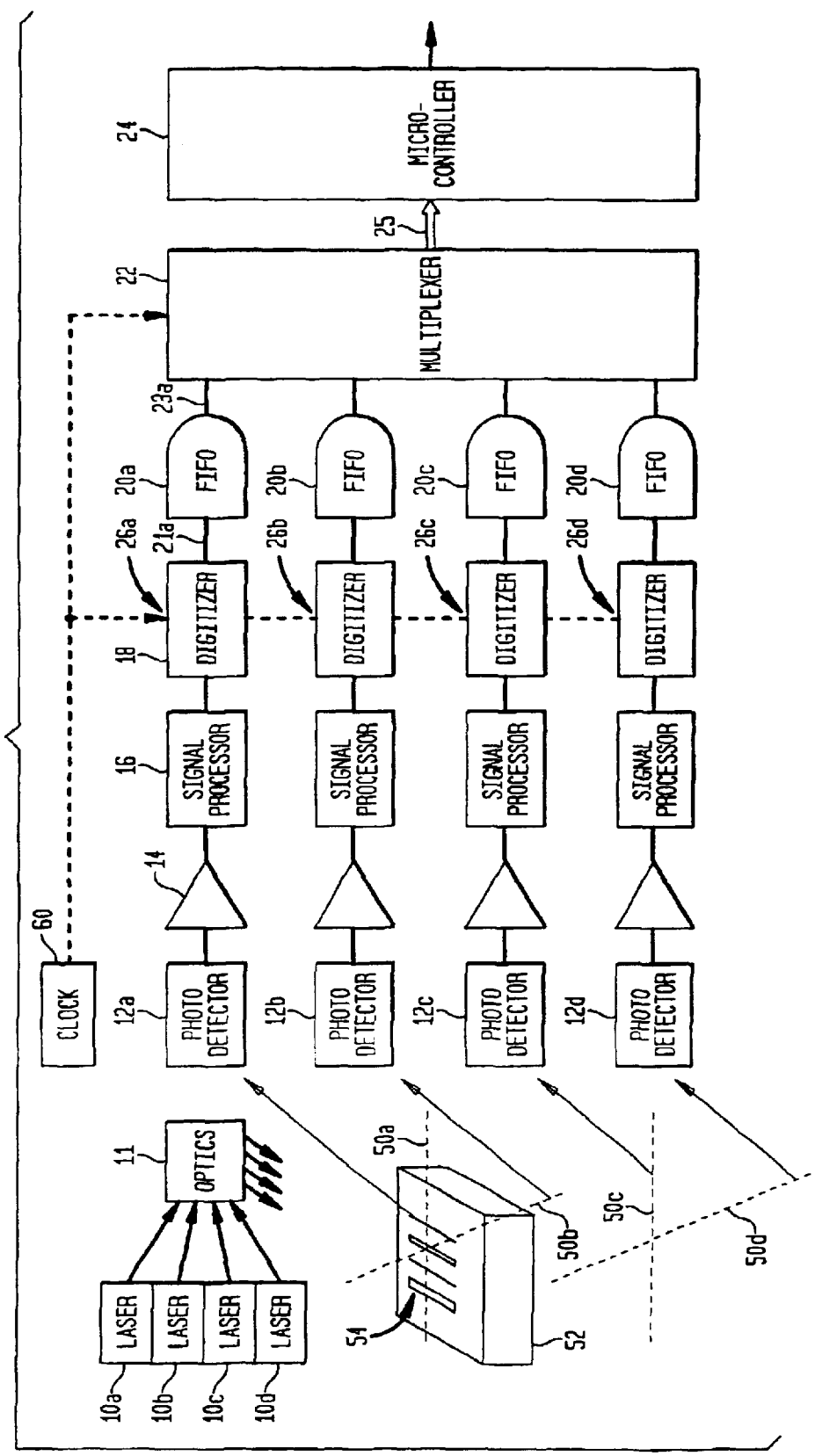
FIG. 1 is a functional block diagram depicting apparatus in accordance with one embodiment of the invention.

As shown in FIG. 1, a scanner according to one embodiment of the present invention includes multiple input channels 26a, 26b, 26c, 26d. Channel 26a includes a photodetector 12a, whereas each of the other channels includes a corresponding photodetector 12b, 12c, 12d. Each photodetector 12 may be any conventional type of photodetector, such as photodiode or phototransistor, which provides an electrical signal representing light impinging on the photodetector.

The scanner further includes lasers 10a–10d and optical elements 11 which are arranged to direct the light from each laser into space so that the light from each laser is focused to a spot and the spot sweeps along a preselected path in space. At the time depicted in FIG. 1, the spot of light from laser 10a is sweeping along line 50a, whereas the spot of light from laser 50b is sweeping along line 50b in a different direction, and the spot of light from lasers 10c and 10d is sweeping along lines 50c and 50d, respectively. Lines 50c and 50d are disposed at a different distance from the optical elements 11 of the scanning system than lines 50a and 50b. The optical elements 11 are also arranged so that light reflected from the spot formed by light from each laser is directed into one photodetector. Thus, channel 26a and its photodetector 12a are associated with laser 10a. Optical elements 11 direct light from the spot formed by laser 10a into photodetector 12a. Stated another way, the field of view of photodetector 12a traces the same path 50a as the spot of light from laser 10a. Thus, as this spot sweeps along path 50a, photodetector 12a will be exposed to light reflected at a series of points along scanning path 50a associated with channel 26a. At the time depicted in FIG. 1, an object 52 bearing a bar code 54 is disposed so that a surface of the object bearing the bar code is present along path 50a. Accordingly, the light reaching photodetector 12a will be light reflected from the code-bearing surface of object 52. In like manner, laser 10b and path 50b are associated with channel 26*b* and photodetector 12*b*, and hence the light reaching photodetector 12*b* will be light reflected from object surfaces along path 50*b*. Similarly, laser 10*c* and path 50*c* are associated with channel 26*c* and photodetector 12*c*, whereas laser 10*d* and path 50*d* are associated with channel 26*d* and photodetector 12*d*. At the time depicted in FIG. 1, no object surface is present along paths 50*c* and 50*d*, and hence the light reaching photodetectors 12*c* and 12*d* will be meaningless background light. At other times, when an object to be scanned is presented in other positions, an object surface may be coincident with paths 50*c* and 50*d*.

Figure 2:
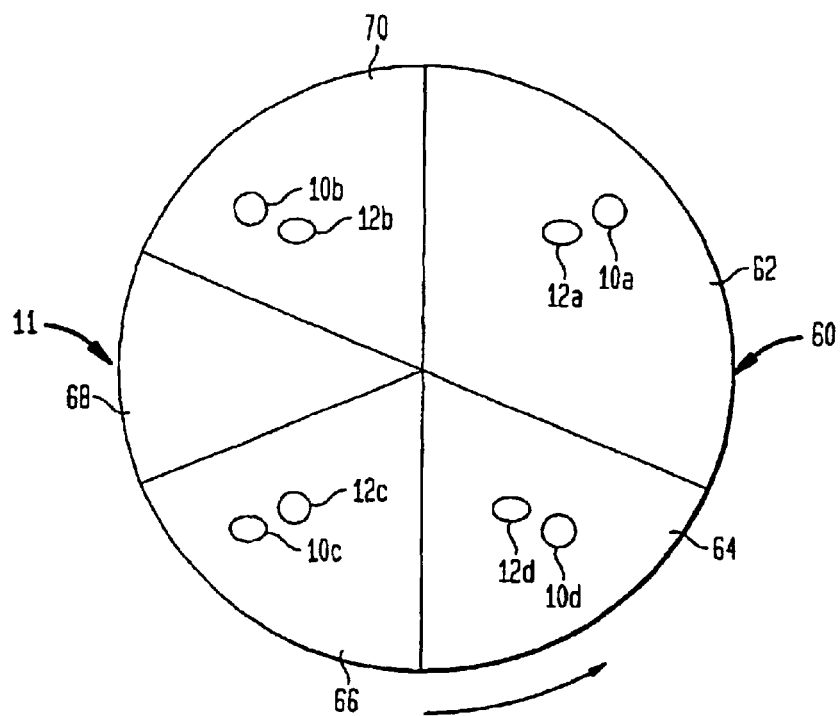
FIG. 2 is a simplified diagrammatic view of certain optical components used in the apparatus of FIG. 1.

Optical elements 11 may be of known type, as, for example, those disclosed in the aforementioned U.S. Pat. No. 5,984,185. FIG. 2 presents a simplified diagrammatic view of such optical elements. Lasers 10*a*–10*d* and photodetectors 12*a*–12*d* are fixedly mounted to a frame (not shown) so that the light from each laser is directed through a spot on a disk 60 bearing holograms 62, 64, 66, 68, 70, and so that each photodetector receives light through a spot on the disk. Conventional optical elements such as lenses and/or mirrors (not shown) may be provided in association with the lasers and photodetectors for directing light to or from the holographic disk. The holograms focus and direct the outgoing light from the lasers, and the incoming light from the environment passing to each photodetector. The disk is rotated relative to the frame, as by a motor (not shown) so the light passing from each laser 10 and to each photodetector 12 passes through different portions of the disk at different times, causing the focal spot of each laser and the spot viewed by each photodetector to sweep along the desired path. Depending on the arrangement of the holograms and associated elements, the paths swept by the spots associated with the various laser beams may be entirely different from one another or may be replicates of one another offset in time, so that the spot associated with each beam is at a different position at any given time.

Input channel 26*a* includes a pre-amplifier circuit 14, a signal processing circuit 16; and a digitizer for conversion to bar/space count data 18. Preamplifier 14 is arranged to amplify the electrical signals from the photodetector 12*a*. The output from the photodetector 12*a* and hence from preamplifier 14 is an analog signal which varies with time as the associated laser beam spot sweeps along path 50*a* and the photodetector is exposed light reflected from various spots on the object surface along the path. When the spot is aligned with a low-reflectivity, dark bar or mark on the object surface, the signal will be relatively low, whereas when the spot is aligned with a high-reflectivity, light spot, the signal will be relatively high.

Signal processor 16 of channel 26*a* receives this time-varying signal and outputs a signal which has either a first value (e.g., 1) denoting a mark or a second value (e.g., 0) denoting a space. In effect, signal processor 16 converts the analog signal to a digital mark/space signal. Signal processor 16 can consist of a comparator which outputs the mark value when the analog signal is above a preset threshold and which outputs the space value when the analog signal is below such threshold. Such a crude circuit, however, is susceptible to errors caused by artifacts such as changes in intensity of the associated laser, differences in the reflectivity of the object surface regions constituting the bar code, and changes in ambient light. Moreover, such a crude circuit will change the output value from mark to space or vice-versa in response to every momentary change in the analog signal, such as brief pulses caused by electrical interference or other artifacts. Numerous circuits are known in the bar code scanning art for processing the analog signals from a photodetector to provide a mark/space signal while substantially suppressing effects due to artifacts in the signal. Any such circuit can be used. One such circuit is disclosed, for example, in U.S. Pat. No. 4,000,397, the disclosure of which is incorporated by reference herein.

The mark/space signal from processor 16 of channel 26*a* is supplied to the digitizer 18 of that channel. The digitizer is also supplied with clock pulses from a system clock 60. The digitizer monitors the mark/space signal and detects transitions in the value of such signal, from mark to space or vice-versa. The digitizer also counts clock pulses between successive transitions. When a transition occurs, the digitizer produces a transition data element including a sign value denoting the transition as either a mark-to-space transition or a space-to-mark transition, and a time value denoting the duration of an interval between the transition which has just occurred and the last previous transition. The digitizer may include, for example, a counter adapted to receive clock pulses from clock 60 and a state change circuit including one or more sets of flip-flops and logic gates which changes state in response to a transition in the mark/space signal. A first latch and reset circuit may be arranged to capture the current value in the counter, to provide the time value or count of clock pulses since the last transition, and to reset the counter to zero, in response to each operation of the state change circuit. Also, a second latch circuit may be arranged to capture the value of the mark/space signal immediately after each operation of the state change circuit, as the sign value for the transition. Other known circuits for detecting transitions in a mark/space signal, counting clock pulses between transitions and providing the sign value for each transition are known in the art. For example, the circuitry disclosed for performing these functions shown in U.S. Pat. No. 5,081,342, the disclosure of which is incorporated herein by reference, may be used.

The other channels 26*b*, 26*c* and 26*d* incorporate elements identical to those of channel 26*a*. Thus, each channel provides a succession of digital transition data elements, each such transition data element incorporating a sign value and a duration or clock count value. The data elements produced by each channel represent the light impinging on the photodetector of such channel. Each data element represents a real or spurious mark or space. Where the light impinging on the photodetector of a particular channel is light actually reflected from an object surface, the marks and spaces denoted by the data elements are real marks and spaces on the object surface. In this case, the duration or clock count value within a data element signifies the time required for the scanning spot moving along the associated scanning path to traverse the mark or space, and hence denotes the dimension of the mark or space along the scanning path.

A first-in, first-out ("FIFO") buffer 20 is associated with each channel. Thus, buffer 20*a* receives the succession of transition data elements from channel 26*a* at an input 21*a* connected to the digitizer 18 of channel 26*a* and stores these data elements. The stored data elements are supplied in the same order, at an output 23*a*. The buffers 20*b*–20*d* associated with channels 26*b*–26*d* operate in the same manner. A multiplexer 22 has inputs connected to the outputs of buffers 20*a*–20*d*. The multiplexer has an output connection 25. Multiplexer 22 operates cyclically. Each cycle of the multiplexer includes a sampling interval associated with each channel. During the first sampling interval of a cycle, the multiplexer conveys data elements from the output of buffer 20*a*, associated with channel 26*a*, to the output connection 25 of the multiplexer. During the second, third and fourth sampling intervals of each cycle, the multiplexer conveys data elements from buffers 20b, 20c and 20d, respectively. Stated another way, the multiplexer retrieves or recovers data elements stored in the buffers.

As a result, a stream of data elements 80 (FIG. 3) appears at output connection 25. The stream 80 includes a series 82a of data elements A from channel 26a, followed by a series 82b of data elements B from channel 26b, which in turn is followed by a series 82c of data elements C from channel 26c, which in turn is followed by a series 82d of data elements D from channel 26d. This pattern repeats on the next cycle of the multiplexer, so that series 82d is followed by a further stream 82a' of data elements from channel 26d, and so on.

The output 25 of multiplexer 22 is connected to a decoder 24. The decoder may be of known type arranged to examine a series of transition data elements and recover encoded information denoted by such transition data elements. Merely by way of example, a fixed program decoder of the type sold under the designation 6-1005415/NCR-8415 may be used to recover numeric information from transition data denoting the marks and spaces of a UPC or EAN bar code. Other known fixed program decoders and programmable decoders can be used to recover numeric or alphanumeric information from transition data denoting other known one-dimensional and two-dimensional bar codes. Although a full discussion of decoders is beyond the scope of this disclosure, it should be appreciated that such decoders generally act to recognize patterns of such as the interrelationships between different mark and/or space widths within a series of such information.

Because each series of data elements 82 in the data stream 80 includes transition data elements denoting mark and space widths in the same order as they were generated by an individual channel, the same programs as conventionally used in decoding information from a single channel will work in the same way with respect to data within each individual series 82. Thus, when the decoder 24 encounters a series of transition data elements representing the mark and space widths associated with a bar code in the correct order, it will supply the numeric values denoted by those data elements to a host computer or other device (not shown) connected to the output of the decoder. In the condition depicted in FIG. 1, path 50a is properly aligned with the bar code 54 on an object being scanned, and hence series 82a; derived from scanning along path 50a, will contain a proper set of transition data elements recognizable to the decoder. Series 82a', also derived from scanning along path 50a, will contain similar information. The other series will contain meaningless sequences, and hence will be ignored by the decoder.

Figure 3:
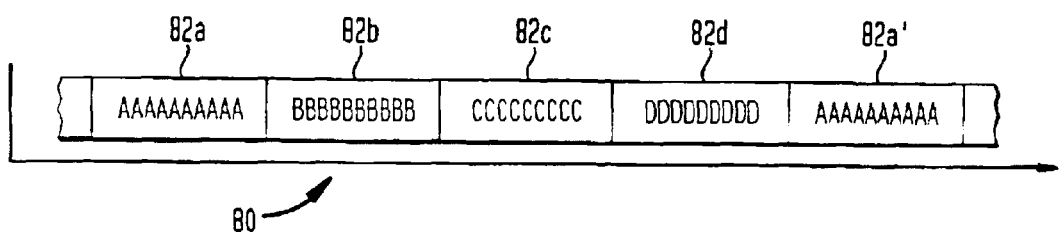
FIG. 3 is a diagram of a stream of data elements used in operation of the apparatus of FIGS. 1–2.

The conventional decoder typically cannot interpret data at junctions between series. For example, the sequence of transition data elements AAAABBBB encountered at the junction between series 82a and 82b in FIG. 3 is meaningless to the conventional decoder. The transition data elements denoting a complete pattern of the type recognized by the decoder desirably are present within an individual series. In the case of a one-dimensional bar code, the maximum number of transition data elements which would represent a single complete bar code corresponds to the maximum number of meaningful marks and spaces encountered in a single line passing through the code in the direction perpendicular to the bars. Such maximum number is referred to herein as the "chain length" of the code. For a two-dimensional bar code, the chain length is the maximum number of meaningful marks and spaces encountered on a single line through the bar code in the proper direction for reading the code. The number of data elements in a single series 82 (the number of consecutive data elements from a single channel) should be greater than the chain length of the code to be read. The greater the length of each series, the greater the probability that a sequence of transition data elements which actually represents a bar code will fall entirely within a single series. The maximum length of each series is determined by the size of the individual buffers 20.

The transition data elements from each channel do not represent meaningful information at all times. For example, during intervals when the boundary between hologram 60 and hologram 62 is passing through the beam from laser 10a and the optical path to the associated photodetector 12a, the laser beam, and/or the field of view of the photodetector, may be blocked or deflected away from the region in space where objects are to be read. Thus, the transition data elements from channel 26a representing light impinging on photodetector 12a during these intervals, referred to herein as "inactive intervals", do not represent meaningful information. Transition data elements representing light impinging on photodetector 12a during other intervals, referred to herein as "active" intervals, will represent meaningful information, if an object is present in correct alignment with the associated scan path 50a. Each of the other channels has similar active and inactive intervals. Most preferably, each series 82 in data stream 80 includes transition data elements from at least one complete active interval of the associated channel, and the transition data elements from each active interval of a given channel are contained within a single series 82 within the data stream. To assure this, the multiplexer 22 may be synchronized with the optical elements 11. For example, a rotary position encoder or other element mechanically connected to the hologram disk 60 may trigger the multiplexer to switch between different channels. Alternatively, the optical elements can be driven in synchronism with the clock 60 which controls operation of the multiplexer.

The structures and methods discussed above may be varied. For example, the digitizer 18 of each channel can be arranged to convert the mark/space signal from the associated processor 16 into a series of one-bit mark or space values representing the output of the channel at preselected sampling times. These mark and space data elements can be multiplexed in the same way as the transition data elements discussed above. In this arrangement, the microcontroller or decoder 24 handles the task of detecting transitions between mark and space, and counting the duration of each mark and space, as by counting the number of data elements between transitions. This approach requires that the buffers and multiplexer handle many more individual data elements. By contrast, where the data elements are transition data elements as discussed above, the data is effectively run-length encoded and hence compressed. In a further variant, the data elements supplied by each channel may be in the form of a series of digital real numbers directly representing intensity of the light impinging on the photodetector of the channel at a series of sampling intervals. For example, the analog output of the photodetector can be passed directly to a multi-bit analog-to-digital converter. The resulting multi-bit digital values constitute the data elements. In this embodiment, the task of translating intensity values to mark/space information is also handled by the decoder. Thus, the decoder desirably is programmed to provide artifact rejection functions corresponding to those performed by the signal processors 16 as discussed above. In a further, distinctly less preferred variant, the buffers and multiplexer can be constructed to handle analog signals.

It is not essential to provide the data stream from the multiplexer with data elements from individual channels arranged in separate series as discussed above. For example, the multiplexer can be arranged to incorporate single data elements from each channel in the data stream, so that the data stream has the configuration ABCDABCD . . . , where A represents a data element from channel 26a, B represents a data element from channel 26b, and so on. In this approach, it is not necessary to store the data elements prior to multiplexing. Where a mixed data stream of this nature is used, the decoder or microcontroller 24 should be arranged to segregate the data elements and form separate series of data elements for pattern recognition purposes. For example, the decoder can include separate buffers for recording the incoming data elements from each channel, or separate memory locations for recording calculation results based on data elements in different series.

The FIFO buffers and multiplexer discussed above can be replaced by other data-handling elements. Merely by way of example, the data elements from the various channels can be written into a random-access memory instead of into a FIFO buffer. Provided that the system maintains a record of the memory locations where data elements from each channel are stored, or writes the data elements into memory locations in a preselected order of locations, the data elements can be read out of the memory in a data stream as discussed above by accessing the memory locations in the desired order. Any other form of memory can be used in a similar manner. However, the arrangement using FIFO buffers and a multiplexer is economical and simple to implement.

In the systems discussed above, only one stream of data elements is provided to a single decoder. However, where the capacity of the decoder is insufficient to handle all of the data from all of the various channels, two or more data streams can be provided to two or more decoders. At least one of these data streams should include data from multiple channels, and the number of decoders should be fewer than the number of channels. As will be appreciated, any number of channels can be provided in the scanner.

The holographic optical components discussed above are merely exemplary. The optical components may include other conventional elements such as fixed and/or moving mirrors, lenses and combinations of these. It is not essential to provide a separate source of illumination such as a laser 10 or other light source for each channel; the light from a single source can be split into multiple beams, so that a single source of illumination such as a laser, light emitting diode or lamp serves as the light source for all of the channels. Also, the invention can be applied in systems where one or more light sources provide illumination over a large region in space and the field of view of the photodetector in each channel is limited to a spot associated with such channel. In this arrangement as well, conventional optical components act to sweep the field of view of each photodetector in a preselected pattern. Indeed the invention can be applied in systems where the spot associated with each channel is fixed relative to the housing of the apparatus and scanning action is achieved by moving objects bearing symbols to be scanned relative to the housing. Also, in each of the systems discussed above, the photodetectors are exposed to light reflected from the object surfaces. However, the optical components may be arranged so that light is transmitted through a wall of an object to be scanned en route to the photodetectors. In this case, the light will vary in accordance with the transmissivity of the object wall, rather than the reflectivity. Other bar code scanners may be arranged to use light emitted by the object as, for example, where the bar code is present as a fluorescent marking, so that the photodetectors are exposed to light representing the intensity of fluorescence. The invention can be applied in scanners which use any optical property.

As these and other variations and combinations of the features discussed above can be utilized without departing from the present invention, the foregoing description of the preferred embodiments should be taken by way of illustration rather than by way of limitation of the invention as defined by the claims.

INDUSTRIAL APPLICABILITY

The invention can be applied in various industries including wholesale and retail trade.

What is claimed is:

1. A scanner comprising:
   (a) a plurality of input channels, each said channel including a photodetector, each such channel providing data elements representing light impinging on the photodetector of such channel, each such channel including a signal processing and digitization circuit connected to the photodetector, wherein the signal processing and digitization circuit of each said channel is arranged to supply said data elements as transition data elements, each such transition data element including data denoting a transition as mark-to-space or space-to-mark and data denoting the duration of an interval between successive transitions;
   (b) means for exposing the photodetectors of said channels to light from objects to be scanned so that the light impinging on the photodetector of each channel represents an optical property of objects to be scanned at a series of points along a scanning path associated with such channel;
   (c) data stream means for accepting data elements from each channel and outputting a stream of data elements including data elements from said plurality of channels; and
   (d) a decoder operative to examine said stream of data elements and recover information denoted by the data elements in said stream;
   wherein said data stream means is operative to provide said stream of data elements so that series of data elements from different channels are provided in alternating sequence, with a series of data elements from one channel followed by another series of data elements from a different channel.

2. A scanner comprising:
   (a) a plurality of input channels, each said channel including a photodetector, each such channel providing data elements representing light impinging on the photodetector of such channel, each such channel including a signal processing and digitization circuit connected to the photodetector, wherein the signal processing and digitization circuit of each said channel is arranged to supply said data elements as transition data elements, each such transition data element including data denoting a transition as mark-to-space or space-to-mark and data denoting the duration of an interval between successive transitions;
   (b) means for exposing the photodetectors of said channels to light from objects to be scanned so that the light impinging on the photodetector of each channel represents an optical property of objects to be scanned at a series of points along a scanning path associated with such channel;

(c) data stream means for accepting data elements from each channel and outputting a stream of data elements including data elements from said plurality of channels; and (d) a decoder operative to examine said stream of data elements and recover information denoted by the data elements in said stream, wherein said data stream means includes a FIFO buffer associated with each said channel and having an input connected to the processing and digitization circuit of such channel and an output, said data stream means further including a multiplexer having inputs connected to the outputs of the FIFO buffers associated with all of said channels and an output connected to said processor.

3. A method of scanning objects bearing codes comprising:

(a) exposing a plurality of photodetectors, each associated with a separate input channel, to light from objects to be scanned so that the light impinging on each photodetector represents an optical property of objects to be scanned at a series of points along a scanning path associated with such photodetector;

(b) operating each such input channel to provide transition data elements representing light impinging on the photodetector of such channel, each such transition data element including data denoting a transition as mark-to-space or space-to-mark and data denoting the duration of an interval between successive transitions for such channel;

(c) storing data elements from each channel;

(d) forming a stream of said data elements including data elements from a plurality of said channels by recovering said stored data elements from each channel and providing a plurality of series of data elements, the data elements within each such series being data elements from a single one of said channels; and (e) examining said stream of data elements in a decoder and recovering information denoted by the data elements in said stream of data elements;

wherein said series of data elements from different channels are provided in alternating sequence in said stream of data elements, with a series of data elements from one channel followed by another series of data elements from a different channel.

4. A method of scanning objects bearing codes comprising:

(a) exposing a plurality of photodetectors, each associated with a separate input channel, wherein each said channel is associated with a separate FIFO buffer, to light from objects to be scanned so that the light impinging on each photodetector represents an optical property of objects to be scanned at a series of points along a scanning path associated with such photodetector;

(b) operating each such input channel to provide transition data elements representing light impinging on the photodetector of such channel, each such transition data element including data denoting a transition as mark-to-space or space-to-mark and data denoting the duration of an interval between successive transitions for such channel;

(c) storing data elements from each channel, including inputting the data elements from each said channel to the FIFO buffer associated with such channel in temporal order;

(c) forming a stream of said data elements including data elements from a plurality of said channels by recovering said stored data elements from each channel and providing a plurality of series of data elements, the data elements within each such series being data elements from a single one of said channels, including outputting samples from one of said FIFO buffers at a time; and (d) examining said stream of data elements in a decoder and recovering information denoted by the data elements in said stream of data elements.

5. A method of scanning objects bearing codes comprising:

(a) exposing a plurality of photodetectors, each associated with a separate input channel, wherein each said channel is associated with a separate FIFO buffer, to light from objects to be scanned so that the light impinging on each photodetector represents an optical property of objects to be scanned at a series of points along a scanning path associated with such photodetector;

(b) operating each such input channel to provide transition data elements representing light impinging on the photodetector of such channel, each such transition data element including data denoting a transition as mark-to-space or space-to-mark and data denoting the duration of an interval between successive transitions for such channel;

(c) storing data elements from each channel including inputting the data elements from each said channel to the FIFO buffer associated with such channel in temporal order;

(c) forming a stream of said data elements including data elements from a plurality of said channels by recovering said stored data elements from each channel and providing a plurality of series of data elements, the data elements within each such series being data elements from a single one of said channels, including outputting samples from one of said FIFO buffers at a time; and (d) examining said stream of data elements in a decoder and recovering information denoted by the data elements in said stream of data elements;

wherein said series of data elements from different channels are provided in alternating sequence in said stream of data elements, with a series of data elements from one channel followed by another series of data elements from a different channel.

* * * * *